United States Patent
Bakken et al.

(10) Patent No.: US 9,553,430 B2
(45) Date of Patent: Jan. 24, 2017

(54) FLEXIBLE CONDUIT FITTING

(71) Applicant: HONEYWELL INTERNATIONAL INC., Morristown, NJ (US)

(72) Inventors: Tom Bakken, Apple Valley, MN (US); Nathan Carlson, Maple Grove, MN (US); Alan Stordahl, Eagan, MN (US); Michael Peterson, Hudson, WI (US); Yong Fang, Tiajin (CN)

(73) Assignee: Honeywell International Inc., Morris Plains, NJ (US)

( * ) Notice: Subject to any disclaimer, the term of this patent is extended or adjusted under 35 U.S.C. 154(b) by 479 days.

(21) Appl. No.: 14/022,828

(22) Filed: Sep. 10, 2013

(65) Prior Publication Data

US 2015/0068332 A1   Mar. 12, 2015

(51) Int. Cl.
   *H02G 3/04*   (2006.01)
   *H02G 3/06*   (2006.01)

(52) U.S. Cl.
   CPC .......... *H02G 3/0406* (2013.01); *H02G 3/0691* (2013.01); *Y10T 74/18056* (2015.01)

(58) Field of Classification Search
   CPC ............................. H02G 3/0406; H02G 3/0691
   USPC ...................................................... 174/50.54
   See application file for complete search history.

(56) References Cited

U.S. PATENT DOCUMENTS

| | | | |
|---|---|---|---|
| 1,238,799 A | 9/1917 | Marchand, Jr. | |
| 1,725,883 A * | 8/1929 | Recker | H02G 3/0691 16/108 |
| 2,466,504 A | 4/1949 | Stoyer | |
| 2,639,927 A | 5/1953 | Billeter | |
| 2,865,978 A | 12/1958 | Modrey | |
| 4,198,537 A | 4/1980 | Mariani | |

(Continued)

FOREIGN PATENT DOCUMENTS

| | | |
|---|---|---|
| EP | 2506377 A1 | 10/2012 |
| GB | 2463517 B | 2/2013 |
| JP | 2012223010 A | 11/2012 |

OTHER PUBLICATIONS

Arlington Industries Inc., "Connectors with the Widest Cable Ranges: for Flex, AC, MC, HCF Cable," 2 pages, 2002. SNP2IT 1006/15M.

(Continued)

*Primary Examiner* — William H Mayo, III
*Assistant Examiner* — Hiram E Gonzalez
(74) *Attorney, Agent, or Firm* — Seager, Tufte & Wickhem, LLP

(57) ABSTRACT

A flexible conduit fitting system includes a housing that defines at least part of a flexible conduit fitting, and a resilient clip supported by the housing. The flexible conduit fitting may include an aperture for receiving an end of a flexible wiring conduit. The resilient clip may have an engagement portion that extends into the aperture of the flexible conduit fitting to engage the generally corrugated outer structure of the flexible wiring conduit. The housing may be configured to support the resilient clip in a manner that allows the resilient clip to flex in a direction of movement of the flexible wiring conduit when the flexible wiring conduit is being inserted into the aperture and past the engagement portion, but to not substantially flex in the direction of movement of the flexible wiring conduit when attempting to withdraw the flexible wiring conduit from the aperture.

18 Claims, 12 Drawing Sheets

(56) References Cited

U.S. PATENT DOCUMENTS

| | | | |
|---|---|---|---|
| 4,619,332 A | 10/1986 | Sheehan | |
| 5,204,499 A | 4/1993 | Favalora | |
| 5,266,050 A | 11/1993 | O'Neil et al. | |
| 5,704,400 A | 1/1998 | Eldridge | |
| 5,731,543 A | 3/1998 | Jorgensen | |
| 5,799,984 A | 9/1998 | Reynolds, Jr. | |
| 5,912,431 A | 6/1999 | Sheehan | |
| 6,020,557 A | 2/2000 | Jorgensen | |
| 6,034,326 A | 3/2000 | Jorgensen | |
| 6,043,432 A | 3/2000 | Gretz | |
| 6,302,747 B1 * | 10/2001 | Bui | H01R 13/648 439/620.01 |
| 6,380,483 B1 | 4/2002 | Blake | |
| 6,444,907 B1 | 9/2002 | Kiely | |
| 7,148,431 B2 | 12/2006 | Pyron | |
| 7,154,042 B2 * | 12/2006 | Auray | H01R 4/646 174/480 |
| 7,154,054 B1 | 12/2006 | Gretz | |
| 7,390,979 B1 | 6/2008 | Johnson | |
| 7,390,980 B1 | 6/2008 | Gretz | |
| 7,461,870 B2 | 12/2008 | Blake | |
| 7,597,563 B2 | 10/2009 | Shinkawa et al. | |
| 7,824,213 B1 | 11/2010 | Korcz et al. | |
| 7,906,726 B1 | 3/2011 | Burkett | |
| 7,931,487 B1 | 4/2011 | Cappuccio et al. | |
| 7,946,624 B2 | 5/2011 | Sakakibara et al. | |
| 8,061,546 B2 | 11/2011 | Ramsey | |
| 8,124,891 B1 * | 2/2012 | Gretz | H02G 3/0691 164/137 |
| 8,323,048 B2 | 12/2012 | Zantout et al. | |
| 8,360,477 B2 | 1/2013 | Flynn | |
| 8,572,805 B2 | 11/2013 | Inoue | |
| 9,062,893 B2 * | 6/2015 | Romanowich | F24F 13/1426 |
| 2005/0269122 A1 | 12/2005 | Pyron | |
| 2006/0000631 A1 | 1/2006 | Blake | |
| 2006/0035580 A1 * | 2/2006 | Anderson | F24F 13/1426 454/309 |
| 2011/0281460 A1 | 11/2011 | Fischbein | |
| 2012/0024597 A1 | 2/2012 | Jafari | |
| 2012/0110781 A1 | 5/2012 | Inoue | |
| 2014/0262488 A1 * | 9/2014 | Korcz | H02G 3/0691 174/535 |

OTHER PUBLICATIONS

Arlington Industries Inc., "SNAP2IT(R) Connectors: With Insulated Throat and Red Tinted Inside Clip," 1 page, printed 2013.

* cited by examiner

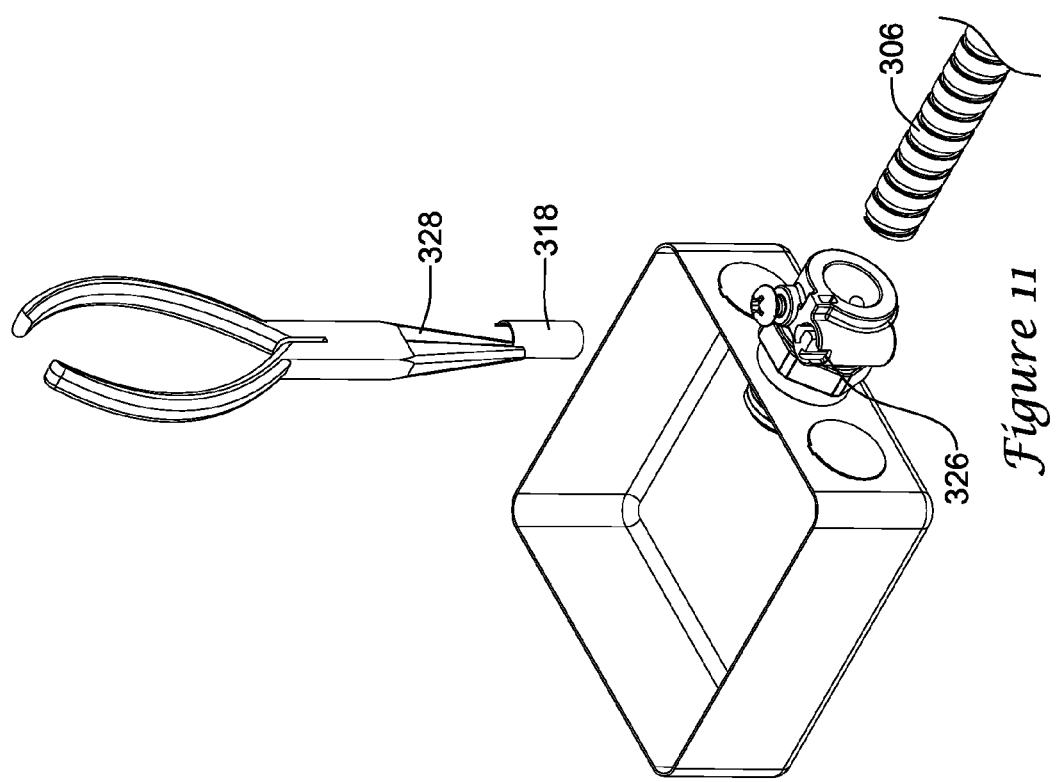

FLEXIBLE CONDUIT FITTING

TECHNICAL FIELD

The disclosure relates generally to flexible conduit, and more particularly, to systems and methods for attaching flexible conduits to other components.

BACKGROUND

Electrical wiring and other components are frequently protected by flexible conduits. Such conduits are typically secured to housings that contain components such as wiring junctions, switches, light fixtures, sensors, actuators, and/or any other suitable components. Often these conduit-housing connections are secured with a set screw or other mechanical method that may require a tool for installation. This may require a time-consuming manipulation in an environment with limited access, illumination and/or space. What would be desirable are devices and methods for making such connections more simply.

SUMMARY

The disclosure relates generally to flexible conduits, and more particularly, to systems and methods for attaching flexible conduits to other components. In one example, a flexible conduit fitting system may include a housing that defines at least part of a flexible conduit fitting, and a resilient clip supported by the housing. The flexible conduit fitting includes an aperture for receiving an end of a flexible wiring conduit. In many cases, the flexible wiring conduit may have a generally corrugated outer structure. The resilient clip may have an engagement portion that extends into the aperture of the flexible conduit fitting to engage the generally corrugated outer structure of the flexible wiring conduit. The housing is configured to support the resilient clip in a manner that allows the resilient clip to flex in a direction of movement of the flexible wiring conduit when the flexible wiring conduit is inserted into the aperture and past the engagement portion, but to not substantially flex in the direction of movement of the flexible wiring conduit when attempting to withdraw the flexible wiring conduit from the aperture. The resilient clip may include a biasing portion in addition to the engagement portion that also extends into the aperture of the flexible conduit fitting to engage and bias the flexible wiring conduit toward an inner wall of the aperture of the flexible conduit fitting. In some examples, the housing may include an access opening for removing the resilient clip through the access opening. In some instances, the housing may include an access opening that reveals at least part of the resilient clip such that a user can manually flex the resilient clip (sometimes without a tool) to disengage the engagement portion from the generally corrugated outer structure of the flexible wiring conduit to facilitate removal of the flexible wiring conduit from the aperture.

In another example, a flexible conduit fitting system structured to receive one or more flexible wiring conduits may include an enclosure that has at least one integrally-formed receptacle structured to receive a flexible wiring conduit originating outside the enclosure, and at least one clip. The clip may correspond to and may be disposed on one side of the integrally-formed receptacle, and may be retained in clip-supporting structures of the enclosure. The clip may generally take the form of a loop of spring material having a first end and a second end adjacent to but offset from the first end. The clip may be structured and positioned to allow the flexible wiring conduit to enter the integrally-formed receptacle from outside the enclosure, but to substantially prevent withdrawal of the flexible wiring conduit from the integrally-formed receptacle via interference between the first end of the clip and a corrugation of the flexible wiring conduit. The clip may both allow entry and prevent withdrawal without requiring manipulation after assembly of the enclosure and the clip. In some instances, the clip may include a release wing proximal the first end that extends away from the loop. This release wing may be accessible to manipulation from outside the enclosure (sometimes without a tool) to move the first end such that it does not interfere with the corrugation of the flexible wiring conduit, allowing withdrawal of the flexible wiring conduit from the integrally-formed receptacle. The loop of the clip may be formed with a rounded bend proximal the second free end of the clip, with the clip positioned in the clip-supporting structures of the enclosure and shaped such that the rounded bend exerts a bias force on the flexible wiring conduit toward a side wall of the integrally-formed receptacle when the flexible wiring conduit is disposed in the receptacle. In some cases, this bias force may be sufficient to maintain electrical conductivity between the conduit and the side wall of the at least one integrally-formed receptacle.

In another example, an HVAC actuator may include an actuator motor, an enclosure housing the actuator motor, and a clip. The enclosure may have an integrally-formed receptacle structured to receive a flexible conduit originating outside the enclosure. The clip may be retained in clip-supporting structures of the enclosure on one side of the integrally-formed receptacle. The clip may be formed as a single piece and structured such that, when the flexible conduit is disposed in the receptacle: (1) a first flexible conduit contacting portion of the clip interferes with removal of the flexible conduit from the integrally-formed receptacle; and (2) a second flexible conduit contacting portion of the clip that is distinct from the first flexible conduit contacting portion and exerts a bias force on the flexible conduit toward a side wall of the integrally-formed receptacle. In some examples, the clip does not substantially inhibit advancement of the flexible conduit from an initial disposition outside the enclosure to a substantially locked disposition in the integrally-formed receptacle in which the first flexible conduit contacting portion interferes with removal of the flexible conduit from the receptacle.

The above summary is not intended to describe each and every example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict several examples and are not intended to limit the scope of the disclosure. The disclosure may be more completely understood in consideration of the following description with respect to various examples in connection with the accompanying drawings, in which:

FIG. 11 is a schematic perspective view of a flexible conduit fitting similar to that shown in FIGS. 8-10B, illustrating removal of a resilient clip.

DESCRIPTION

The following description should be read with reference to the drawings, in which like elements in different drawings are numbered in like fashion. The drawings, which are not necessarily to scale, depict selected examples and are not intended to limit the scope of the disclosure. Although examples of construction, dimensions, and materials are illustrated for the various elements, those skilled in the art will recognize that many of the examples provided have suitable alternatives that may be utilized.

Figure 1:
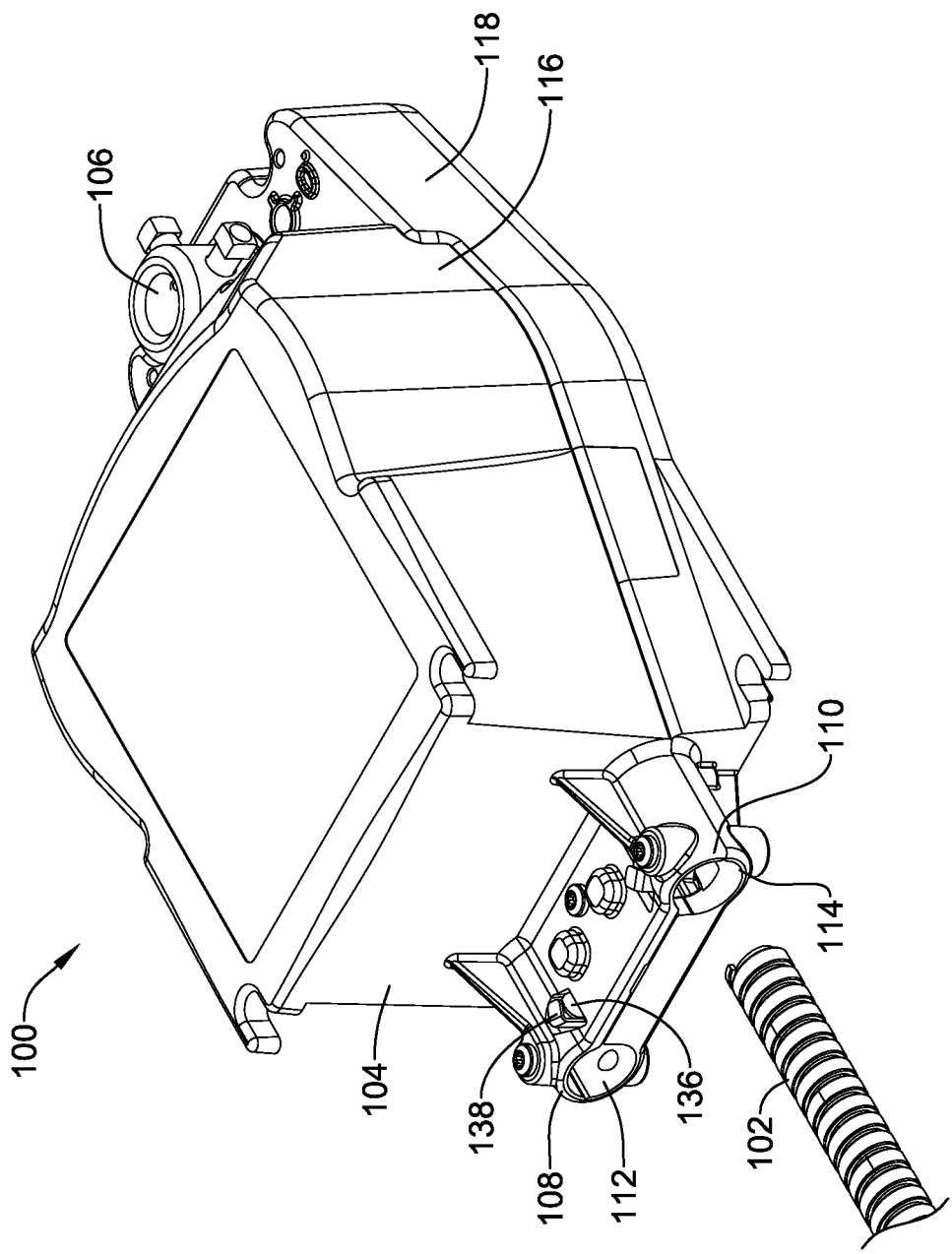
FIG. 1 is a schematic perspective view of an illustrative HVAC actuator and a flexible wiring conduit that may be secured to a housing of the HVAC actuator.

FIG. 1 is a schematic perspective view of an illustrative but non-limiting HVAC actuator 100 and a flexible wiring conduit 102 that may be secured to an enclosure or housing 104 of the HVAC actuator. HVAC actuator 100 may be coupled to any suitable device amenable to actuation by the actuator, such as a valve, damper, vane, etc. An actuator output shaft (not shown) may be coupled to actuator 100 at shaft interface 106. While an HVAC actuator 100 is used here as an example, it is contemplated that the systems and methods of the present disclosure may be used to secure flexible conduits to any suitable device or housing, including junction boxes, switches, light fixtures, sensors, and/or any other suitable devices and/or components. Similarly, while a flexible wiring conduit 102 is used here as an example, any suitable conduit may be used, to house any suitable contents. Flexible wiring conduit 102 may be formed from any suitable material or materials, including metals and/or polymers. In some cases, wiring conduits may be conductive, which may allow shielding or grounding functions. In many cases, flexible wiring conduit 102 have a generally corrugated outer structure to facilitate bending of the flexible wiring conduit 102.

The illustrative housing/enclosure 104 of HVAC actuator 100 defines two flexible conduit fittings 108, 110, with each conduit fitting including an aperture 112, 114 structured to receive an end of a flexible wiring conduit such as conduit 102. In the example shown, the flexible conduit fittings 108, 110 may be integrally-formed receptacles with the housing/enclosure 104, and may be structured to receive flexible wiring conduits originating outside the enclosure, like conduit 102. While the conduit fittings may be integrally formed with the housing/enclosure 104, it is contemplated that they may be separately formed. Housings of devices contemplated in the present disclosure may include one, two, three, four, or any suitable number of flexible conduit fittings, as desired.

Figure 2:
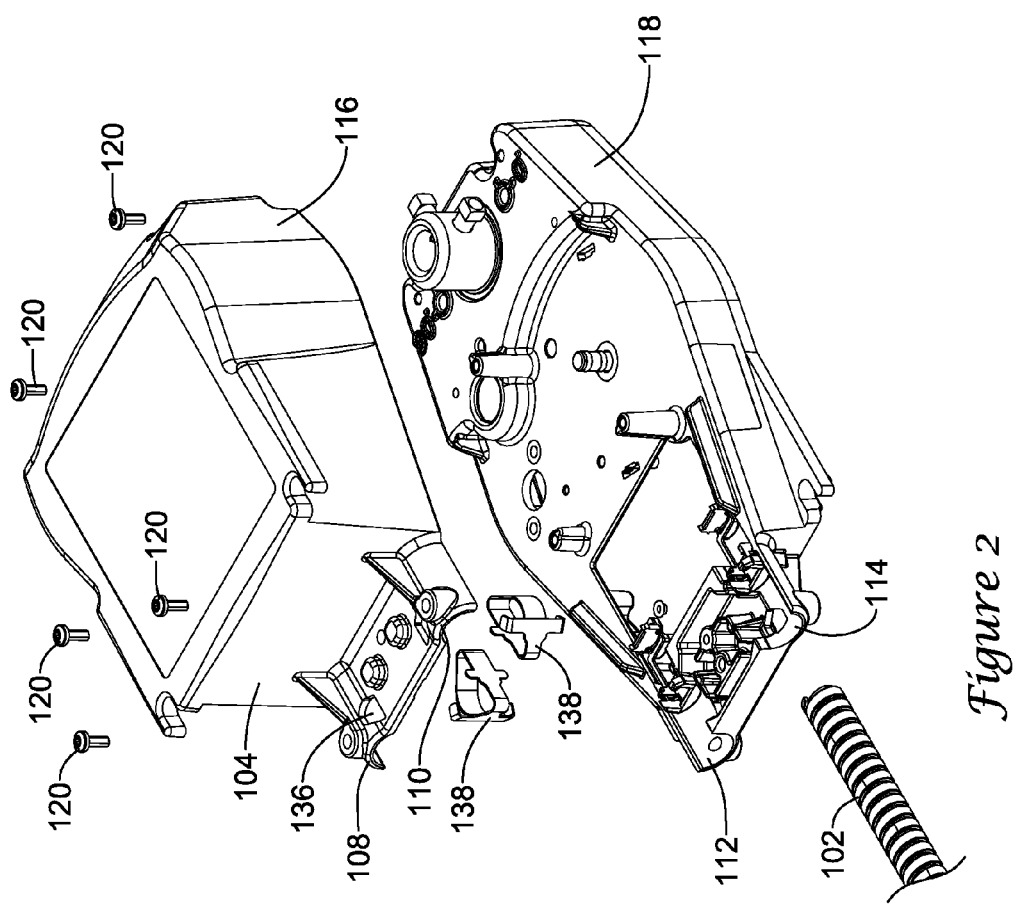
FIG. 2 is an exploded schematic perspective view of the HVAC actuator of FIG. 1.

In FIG. 1, housing 104 of HVAC actuator 100 may include a first housing portion 116 and a second housing portion 118, which may be releasably secured to each other by any suitable fastening mechanism or mechanisms, such as screws 120 or a snap fit. FIG. 2 is an exploded schematic perspective view of HVAC actuator 100 that illustrates how the housing portions 116, 118 may relate. In some illustrative examples, housing portions may be secured to each other by means that are not releasable, or not easily releasable. In some examples, housings may be structured with more or fewer portions. In the illustrative example of housing 104 of HVAC actuator 100, each of first housing portion 116 and second housing portion 118 define part of each conduit fitting 108, 110, and each of the housing portions 116, 118 surrounds part of the aperture 112, 114 of each conduit fitting, but this is not necessary. In some instances, a single housing portion may define all or a substantial majority of one or more or all conduit fittings of a housing. In some cases, multiple housing portions may define different parts of the various conduit fittings of a housing. More generally, any practicable configuration of housing portions defining conduit fittings may be used.

Figure 3:
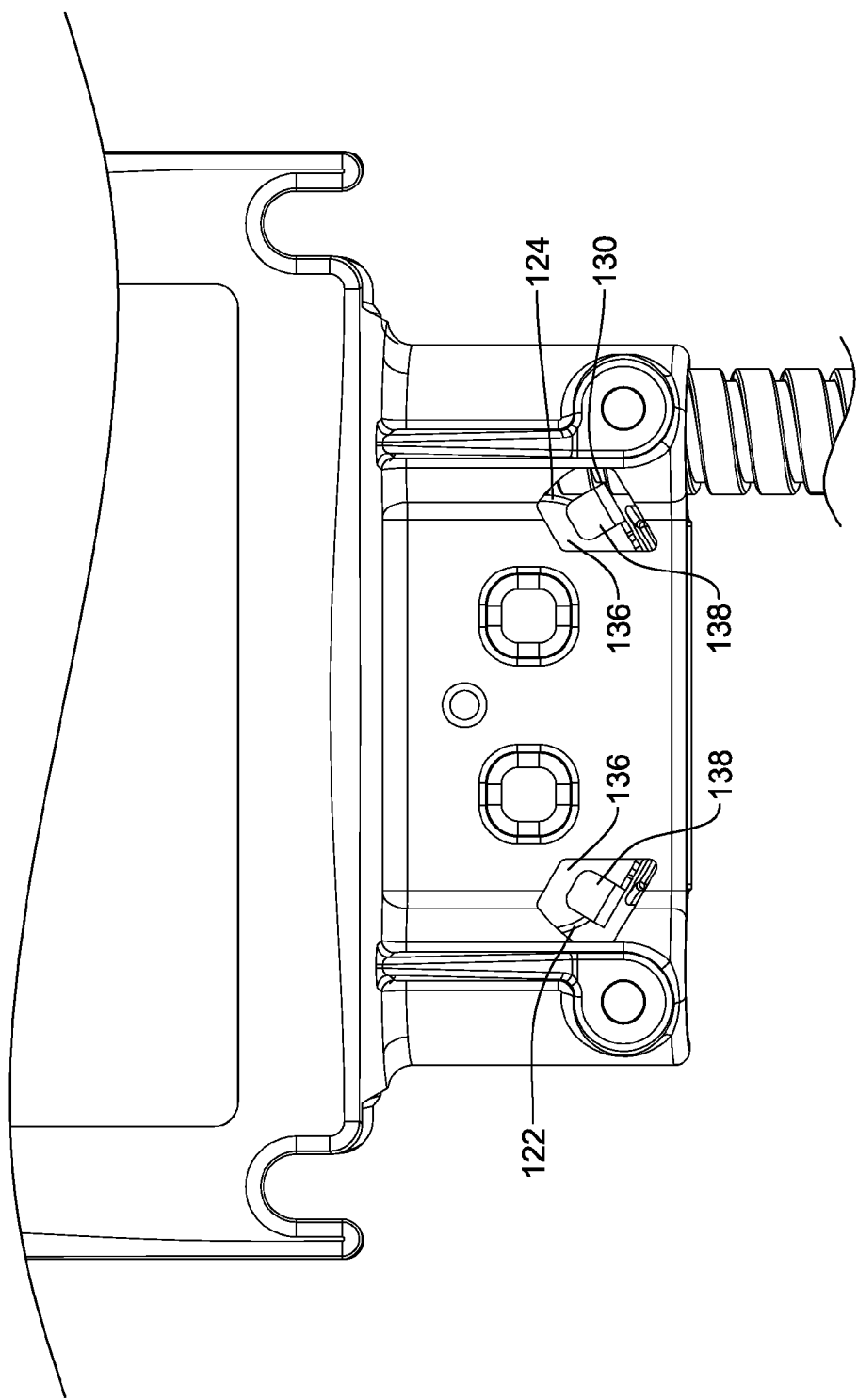
FIG. 3 is a top view of a portion of the HVAC actuator of FIGS. 1 and 2 illustrating details of conduit fittings, with a flexible wiring conduit secured to the right conduit fitting.
Figure 4:
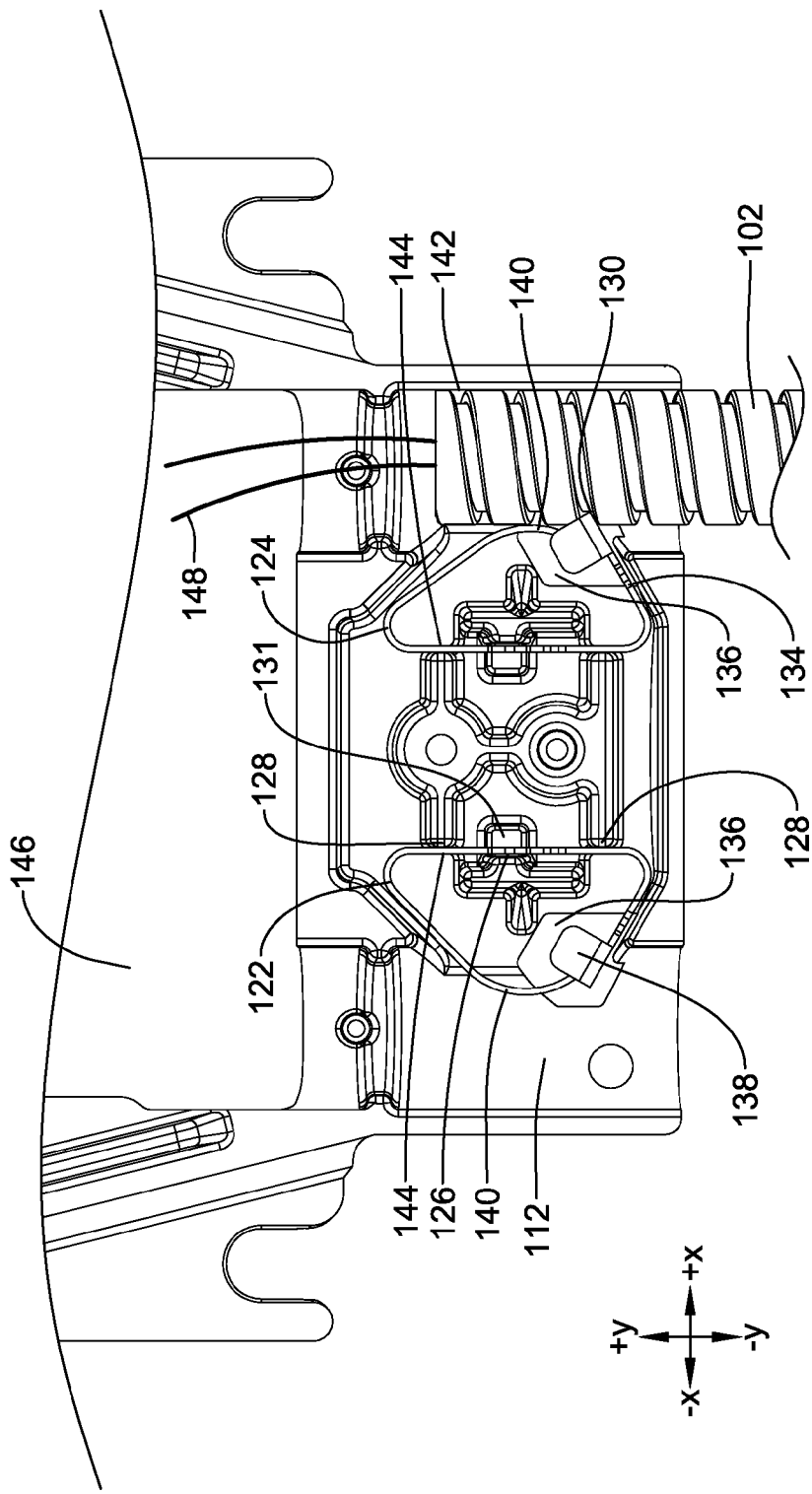
FIG. 4 is a top view of the HVAC actuator of FIG. 3 with an upper housing portion removed to reveal interior details.
Figure 5:
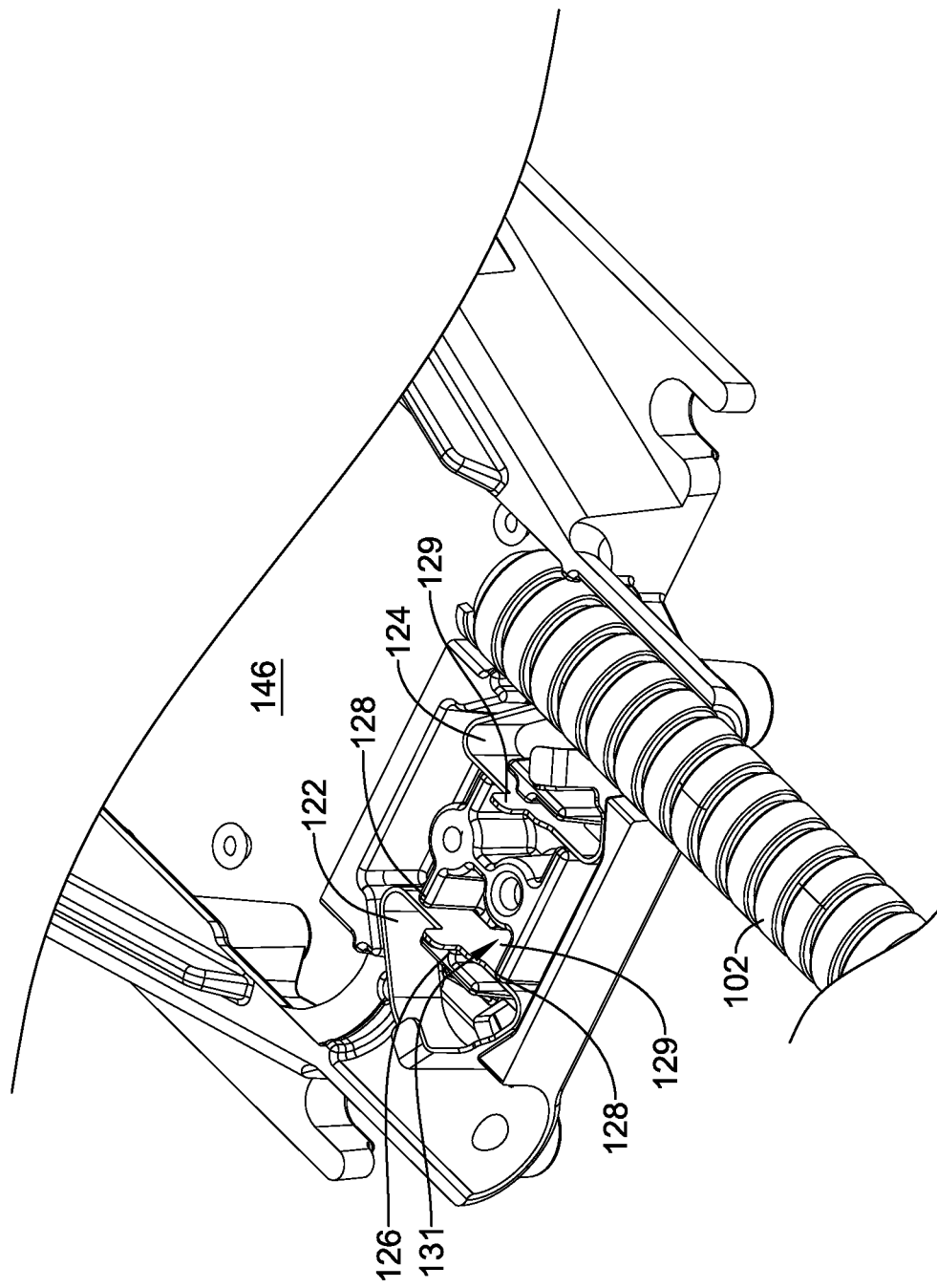
FIG. 5 presents another perspective view of the HVAC actuator of FIG. 4.

FIG. 3 is a top view of a portion of HVAC actuator 100 illustrating detail of the conduit fittings 108, 110, with a flexible wiring conduit 102 secured to conduit fitting 110 on the right side of the figure, with conduit fitting 108 on the left being unoccupied. FIG. 4 presents a view like that of FIG. 3, but with the first housing portion 116 removed to reveal the interior of HVAC actuator 100. FIG. 5 presents a perspective view of the same configuration as FIG. 4.

As illustrated for example in FIGS. 4 and 5, housing 104 may define a cavity 146 that is in fluid communication with apertures 112, 114. The cavity 146 may be configured to receive one or more wires 148 from a flexible wiring conduit such as conduit 102. The cavity 146 may be configured to receive and/or house any suitable component or device that is connectable to the one or more wires 148 from the flexible wiring conduit 102, such as an actuator (not shown), which may be an actuator motor, or other electrical component (not shown) such as a switch, controller or any other suitable component. In some instances, the cavity 146 may be configured as a wiring box.

Each of conduit fittings 108, 110 of housing 104 includes a resilient clip 122, 124. Resilient clips 122, 124 may be supported by the housing 104 of HVAC actuator 100, and may be supported by the housing relative to the clips' respective flexible conduit fittings 108, 110 such that the clips 122, 124 may provide one or more functions to the coupling of flexible conduits to the flexible conduit fittings. The clips 122, 124 may be supported by structures of the housing 104 such that translational movements of the clips in various directions are constrained, and to some extent, allowed. For example, in reference to FIG. 4, clip 122 may be constrained from moving in the −x direction by housing structure 126 and constrained from moving in the +x direction by housing structure 128. Similarly, the clips 122, 124 may be prevented from flexing in some directions by the presence of structures of the housing 104 that interfere with flexure, and also allowed to flex in some directions without interference from structures of the housing, as discussed further herein. Resilient clips 122, 124 may include other features such as position constraint wings 129 that may cooperate with clip-supporting structures of housing 104 to define, in part, the positional relationship of the clips to the housing 104. In the case of clip 122, as viewed for example in FIG. 5, the lower position constraint wing 129 cooperates with recess 131 of second housing portion 118 to floatingly constrain the clip relative to the housing 104. Structuring the housing 104 and clips 122, 124 to allow the clips to float relative to the housing may contribute to, for example, ease of assembly.

Figure 6:
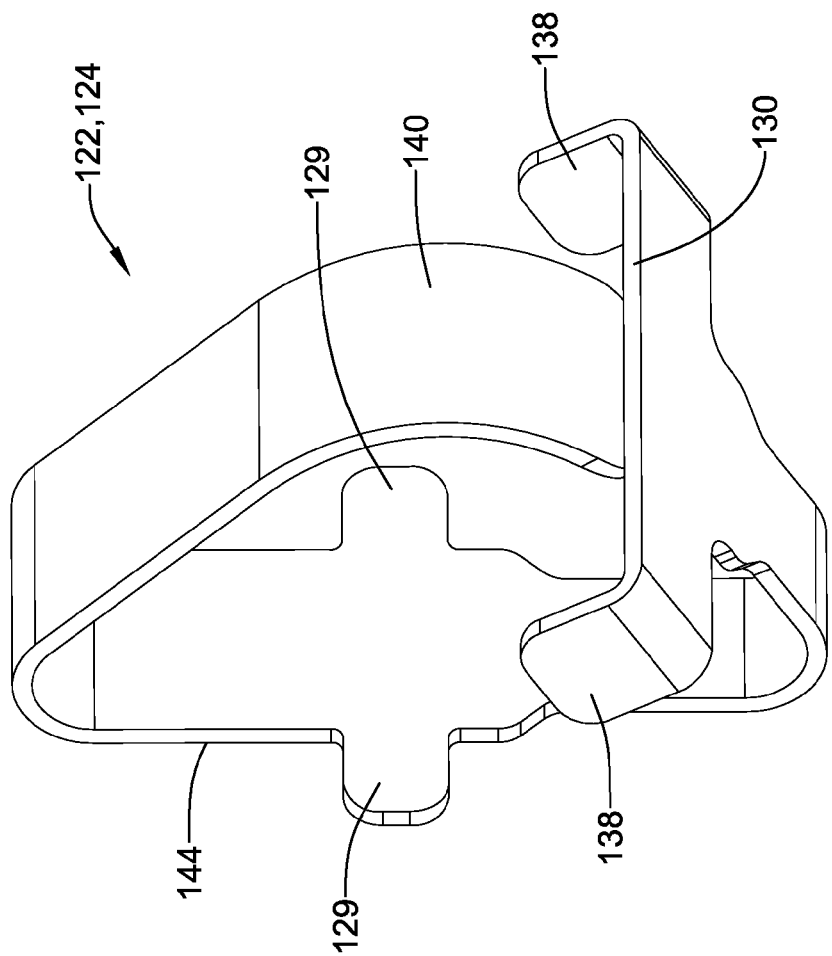
FIG. 6 is a schematic perspective view of an illustrative resilient clip employed in the HVAC actuator of FIGS. 1-5.
Figure 7:
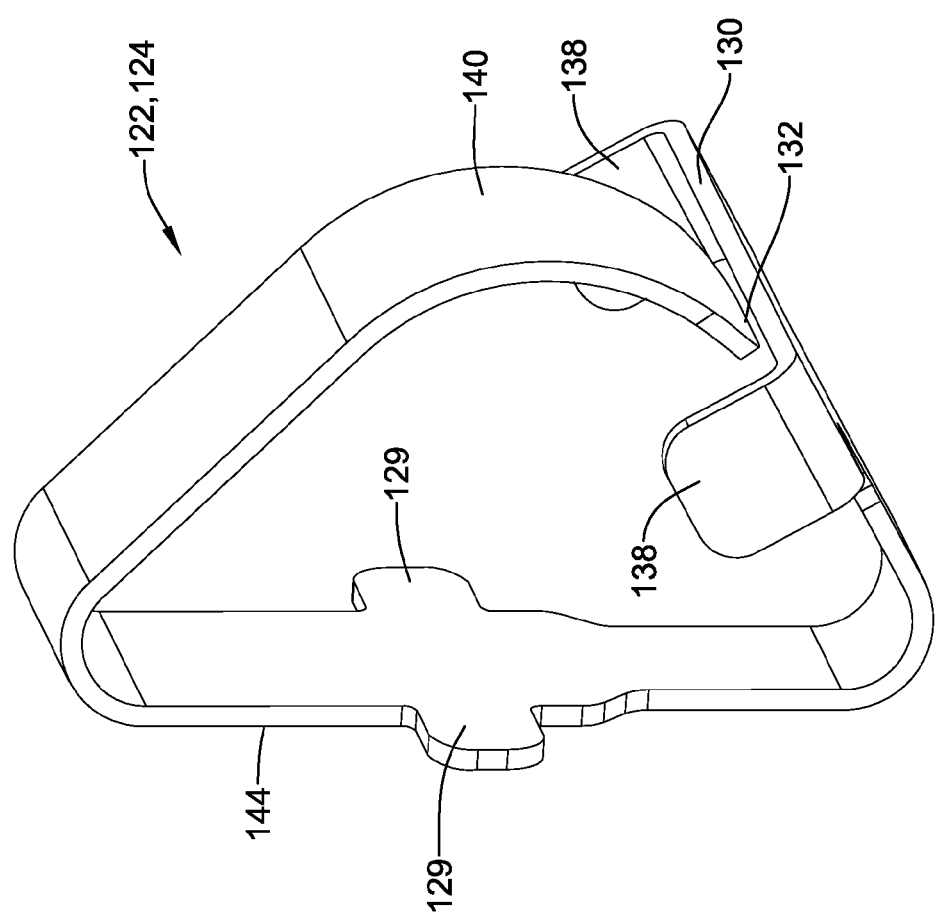
FIG. 7 is another schematic perspective view of the resilient clip of FIG. 6.

FIGS. 6 and 7 are schematic perspective views of one of resilient clips 122, 124. In the example of FIG. 1-7, resilient clips 122, 124 may be essentially identical in structure, exhibiting symmetry such that they may be used interchangeably in left-handed or right-handed configuration, but neither identicality nor symmetry are necessary in all configurations. In some instances, multiple clips that are not symmetrical and/or not identical may be employed. Resilient clips 122, 124 may generally take the form of a loop of spring material having a first end 130 and a second end 132 adjacent to but offset from the first end, as perhaps best viewed in FIG. 6, although this is not limiting, and other configurations are contemplated.

Returning to FIGS. 3, 4, and 5, flexible wiring conduit 102 is shown disposed in aperture 114 of flexible conduit fitting 110, having previously been advanced in the +y direction from outside housing 104. First end 130 of resilient clip 124 extends into the aperture 114 of flexible conduit fitting 110 to engage the generally corrugated outer structure of the flexible wiring conduit 102. As such, first end 130 may be referred to as an engagement portion of clip 124. The housing may be configured and structured to support the resilient clip 124 in a manner that allows the resilient clip to flex in a direction of movement of the flexible wiring conduit 102 when the flexible wiring conduit is being inserted into the aperture 114 and past the engagement portion 130. For example, in relation to the coordinate system of FIG. 4, as the flexible wiring conduit 102 is advanced in the +y direction when being inserted into aperture 114 of flexible conduit fitting 110, a portion of resilient clip 124 that includes engagement portion 130 may flex generally in the +y and −x directions particularly (but not necessarily exclusively) as a larger-diameter portion (a corrugation "crest") of the flexible wiring conduit exert force on the engagement portion of the clip. As a larger-diameter portion of the flexible wiring conduit 102 advances in the +y direction beyond the engagement portion 130, the engagement portion and connected portions of the resilient clip 124 may then spring at least partially back in they and +x directions as a smaller-diameter portion (a corrugation "trough") of the flexible wiring conduit advances proximal the engagement portion. As the generally corrugated flexible wiring conduit 102 with alternating larger- and smaller-diameter portions continues to advance in the +y direction, the flexure cycle may repeat. Note that the structure of housing 104 may substantially allow (that is, not prevent) flexure of portions of the resilient clip 124 including engagement portion 130 as the flexible wiring conduit 102 is advanced into the flexible conduit fitting 110, such that the flexible wiring conduit is allowed to advance (that is, is not prevented from advancing) into the flexible conduit fitting.

Considering now motion or potential motion of the flexible wiring conduit 102 in the opposite direction, the housing 104 may be configured and structured to support the resilient clip 124 in a manner that allows the resilient clip to not substantially flex in the direction of movement of the flexible wiring conduit when attempting to withdraw the flexible wiring conduit from the aperture 114 of the flexible conduit fitting 110. For example, in relation to the coordinate system of FIG. 4, as an attempt is made to withdraw the flexible wiring conduit 102 from the aperture 114 of the flexible conduit fitting 110 in they direction, a larger-diameter portion of the flexible wiring conduit may exert a force on the engagement portion 130 of the resilient clip 124 in the −y direction that would, if unopposed, tend to flex a portion of the resilient clip in the −y and +x directions. In opposition to this force exerted by the flexible wiring conduit 102 on the resilient clip 124, a housing structure 134 may provide support to (that is, exert a force on) the loop of the resilient clip adjacent to engagement portion 130 that prevents the engagement portion from flexing in the −y and +x directions (or more generally in the direction of movement of the flexible wiring conduit) when attempting to withdraw the flexible wiring conduit from the aperture 114. Additionally, the flexible wiring conduit 102 may exert a force on the engagement portion 130 of the resilient clip 124 that opposes motion of the engagement portion in the +x direction, and consequently, such a force exerted by the flexible wiring conduit on the resilient clip may oppose flexure of the resilient clip. Being supported by the housing 104, the resilient clip 124 may exert, via interference between its engagement portion or first end 130 and a corrugation of the flexible wiring conduit 102, a force in the +y direction that substantially prevents withdrawal of the flexible wiring conduit from the flexible conduit fitting 110.

To recap and express some of the preceding concepts in alternative language, considering the role of the resilient clip 124 in concert with the housing/enclosure 104, when manipulating the flexible wiring conduit 102 relative to the flexible conduit fitting 110, the clip may both allow entry and prevent withdrawal of the conduit without requiring manipulation (after assembly) of the enclosure and the clip. In at least some illustrative examples, the resilient clip 124 may not substantially inhibit advancement of the flexible conduit 102 from an initial disposition outside the enclosure 104 to a substantially locked disposition in the integrally-formed receptacle 110 in which the engagement portion of first end 130 interferes with removal of the flexible conduit from the receptacle.

In some instances, flexible conduit fitting systems of the present disclosure may include one or more features that allow for the release of a flexible conduit that is retained in a flexible conduit fitting by a clip. For example, in the system illustrated in FIGS. 1-4, first housing portion 116 and second housing portion 118 may include access openings 136 that reveal at least part of the loops of resilient clips 122, 124 such that a user can manually flex the loop (sometimes without tools) to disengage the engagement portion 130 from the generally corrugated outer structure of a flexible wiring conduit to facilitate removal of the flexible wiring conduit from the aperture 112, 114. That is, to remove flexible wiring conduit 102 from flexible conduit fitting 110, a user may manually flex the loop of resilient clip 124 proximal engagement portion 130 in the +y and −x directions, and withdraw the flexible wiring conduit in the −y direction while holding engagement portion of the resilient clip away from the conduit. To facilitate such flexing of the loop, a resilient clip 122, 124 may include at least one release wing 138 proximal the first end 130 of the clip that extends away from the loop, with the release wing being accessible to manipulation from outside the enclosure 104 (for example, via access openings 136) to move the first end such that it does not interfere with the corrugation(s) of the flexible wiring conduit 102, allowing withdrawal of the flexible wiring conduit from the integrally-formed receptacle (flexible conduit fitting). Note that while the system illustrated in FIGS. 1-4 includes an access opening 136 for each resilient clip 122, 124 in each of housing portions 116 and 118, in some illustrative examples fewer or greater numbers of access openings may be provided.

As discussed elsewhere herein, first housing portion 116 and second housing portion 118 may be releasably secured to each other. When first housing portion 116 and second housing portion 118 are secured to each other, resilient clips 122, 124 may be supported between the first and second housing portions. When first housing portion 116 and second housing portion 118 are released from each other, either resilient clip 122, 124 may be removed when the housing portions are separated by a sufficient distance to create an access opening such that structures of the housing 104 do not prevent such removal. The housing 104 may be structured such that the resilient clips are freely removable from and placable into at least some of the clip-supporting structures of the enclosure. In some illustrative examples, an access opening sized to permit removal of a resilient clip may be provided in a housing without requiring manipulation and/or removal of any portion of the housing. Removal of a resilient clip via an access opening may be performed to release a flexible conduit from a flexible conduit fitting in systems of the present disclosure.

Resilient clips may contribute to additional functions beyond retention of flexible conduits in flexible conduit fittings (while allowing entry of the conduits into the fittings). In addition to engagement portion 130, resilient clips 122, 124 may include a biasing portion 140 that also extends into the apertures 112, 114 of the flexible conduit fittings 108, 110. The biasing portion 140 may be in the form of a rounded bend, as shown, but this is not necessary in all examples. As illustrated on the right-hand side of FIG. 4, when the flexible wiring conduit 102 is disposed in the flexible conduit fitting 110, the biasing portion 140 may engage and bias the conduit toward side wall 142 that defines, at least in part, the aperture 114 of the flexible conduit fitting 110. The resilient clip 124 may be structured such that the biasing force exerted by the biasing portion 140 of the clip on the flexible wiring conduit 102 is sufficient to maintain electrical conductivity between the conduit and the side wall 142 of the flexible conduit fitting 110. In some cases, the loop of resilient clips 122, 124 may include a substantially flat section 144 substantially opposite the biasing portion 140 (in the form of a rounded bend as illustrated). The substantially flat section 144 may be supported by one or more supports such as housing structures 128 of the clip-supporting structures of the housing 104, which are positioned to support the loop of the resilient clip 122 against the reaction force exerted by a flexible wiring conduit counter to the biasing force exerted by the rounded bend on the flexible wiring conduit.

Figure 8:
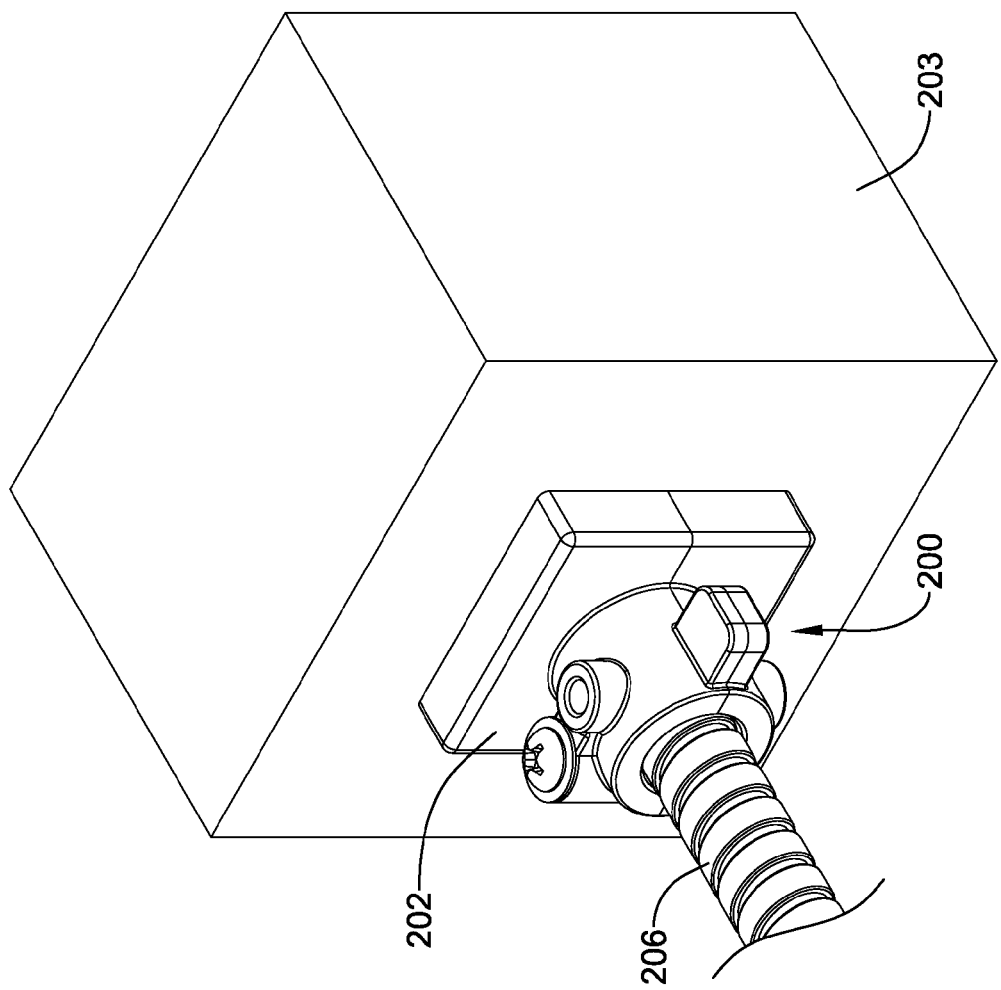
FIG. 8 is a schematic perspective view of another illustrative flexible conduit fitting attached to a housing, with a flexible wiring conduit secured to the fitting.

Further examples of flexible conduit fitting systems are contemplated in the present disclosure. For example, FIG. 8 is a schematic perspective view of a flexible conduit fitting 200 attached to a housing 203. Flexible conduit fitting 200 may be integrally formed with housing 202, but this is not required. In some examples, housing 202 of flexible conduit fitting 200 may be attached to larger housing 203. In other examples, what are illustrated as separate housings 202 and 203 in FIG. 8 may be a single integral housing with integrally formed flexible conduit fitting 200, and, in some cases, one or more additional flexible conduit fittings. In some instances, a flexible conduit fitting having features like flexible conduit fitting 200 may be reversibly or irreversibly attached to a larger housing. Housing 203 may take any suitable form. Housing 203 may enclose a cavity 204, which may be configured to receive one or more wires (not shown) from a flexible wiring conduit such as conduit 206. The cavity 204 may be configured to receive and/or house any suitable component or device that is connectable to the one or more wires from the flexible wiring conduit 206, such as an actuator (not shown), which may be an actuator motor, or other electrical component (not shown). In some illustrative examples, the cavity 204 may be configured as a wiring box.

Figure 9:
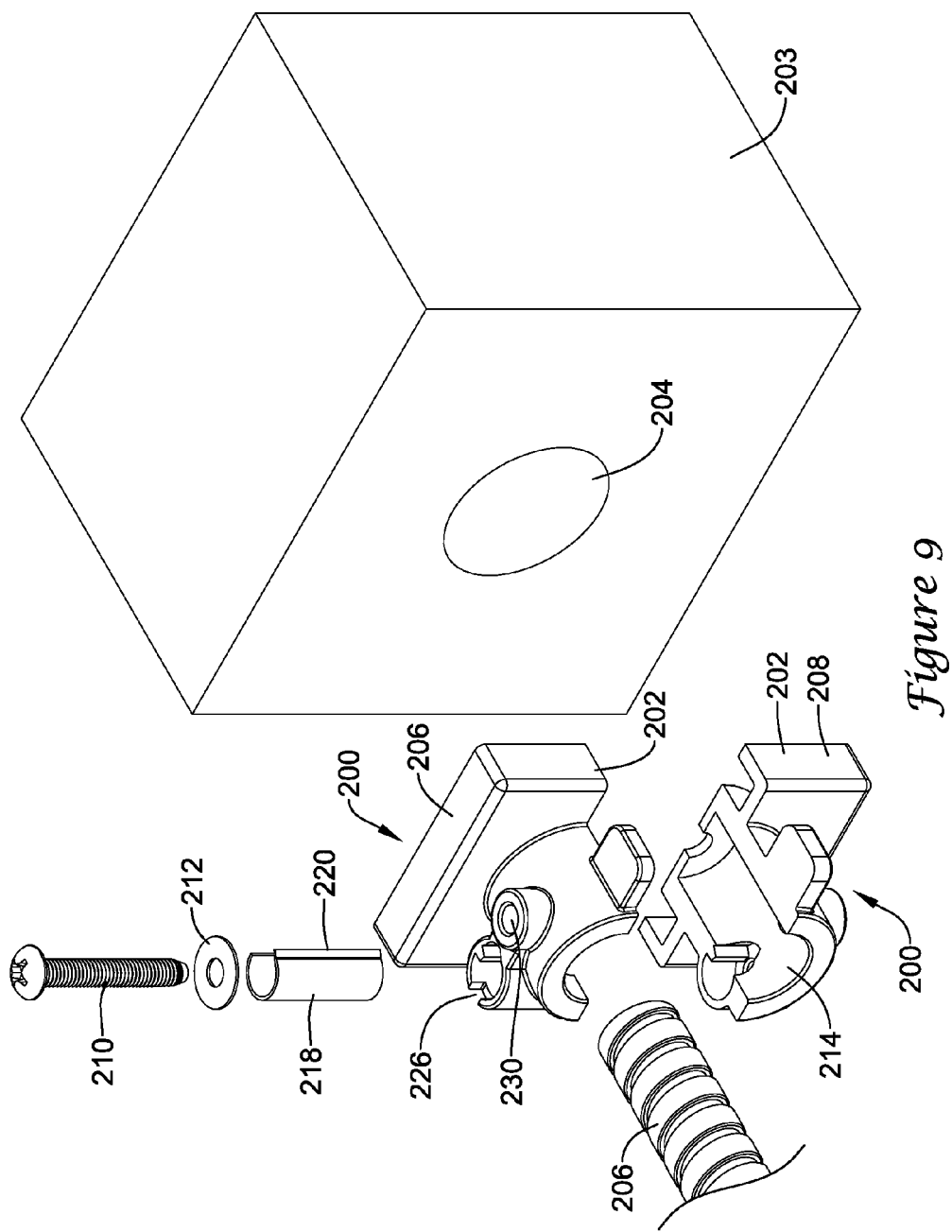
FIG. 9 is an exploded schematic perspective view of the flexible conduit fitting, housing, and conduit of FIG. 8.

FIG. 9 is an exploded schematic perspective view of flexible conduit fitting 200 and housing 203 of FIG. 8. Housing 202 of flexible conduit fitting 200 may include a first housing portion 206 and a second housing portion 208. First housing portion 206 and second housing portion 208 may be securing by a fastener such as screw 210. Additional fasteners or mechanisms may be employed as well. A third housing portion or washer 212 may also be secured to the housing 203 by screw 210. In the illustrative flexible conduit fitting 200 of FIGS. 8 and 9, removing washer 212 from the otherwise assembled flexible conduit fitting may open an access opening into the interior of the flexible conduit fitting.

Flexible conduit fitting 200 of FIGS. 8-9 may include an aperture 214 for receiving an end of a flexible wiring conduit 206 having a generally corrugated outer structure. Flexible conduit fitting 200 includes a resilient clip 218, supported by housing 202. Resilient clip 218 may include an engagement portion 220 that extends into aperture 214 of flexible conduit fitting 200. When flexible wiring conduit 206 is disposed in aperture 214 of flexible conduit fitting 200, the engagement portion 220 extending into aperture 214 may engage the conduit and prevent removal of the conduit from the flexible conduit fitting. For an additional, alternative, or backup means for securing a conduit to the fitting 200, a socket 230 may be receive a set screw or other fastener (not shown) which may engage a conduit disposed in aperture 214 and prevent or at least retard its release.

Figure 10A:
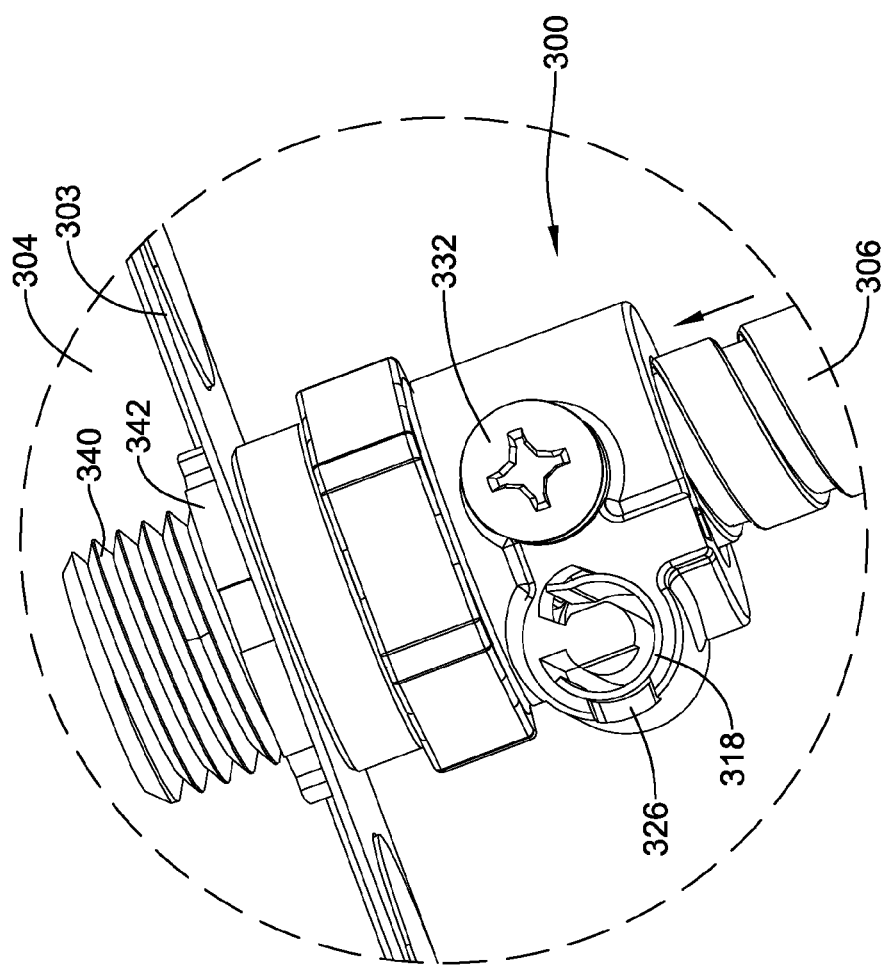
FIG. 10A is a schematic perspective view of the flexible conduit fitting of FIGS. 8 and 9, illustrating action of the resilient clip during insertion of the flexible wiring conduit.
Figure 10B:
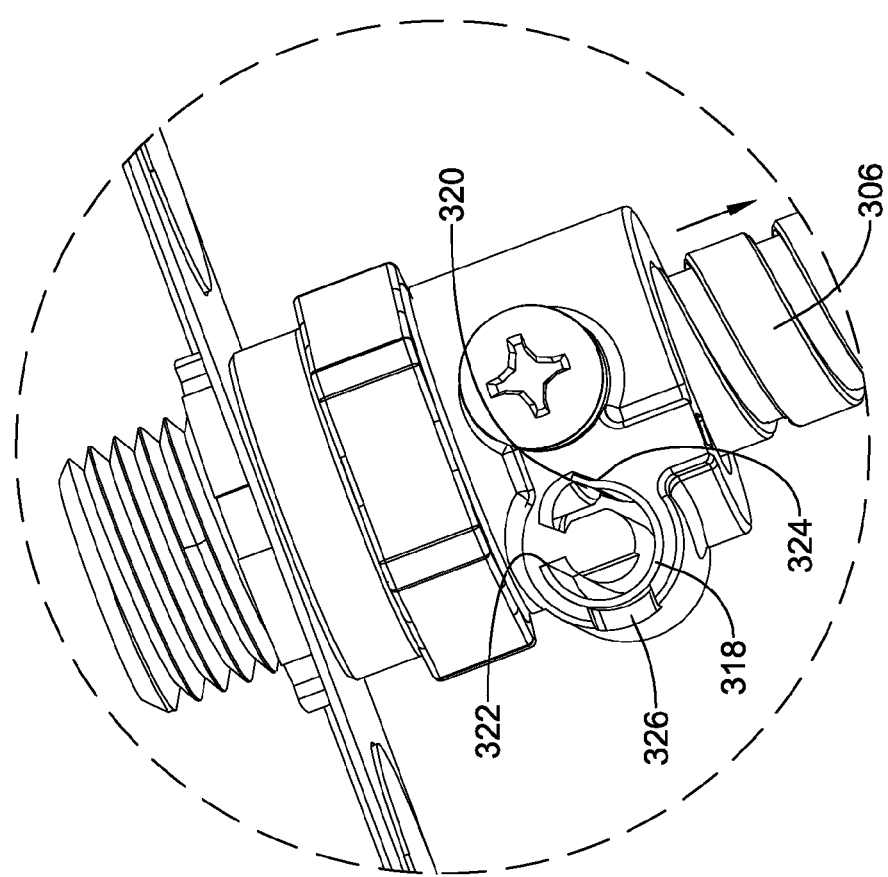
FIG. 10B is a schematic perspective view similar to that of FIG. 10A, illustrating action of the resilient clip during attempted withdrawal of the flexible wiring conduit.

FIGS. 10A and 10B are schematic perspective views of flexible conduit fitting 300 with flexible wiring conduit 306 during insertion (FIG. 10A) and attempted withdrawal (FIG. 10B) of the flexible wiring conduit. In some instances, flexible conduit fitting 300 may be secured to a housing 303, which may be a wiring box or any other suitable device, via threaded portion 340 and locknut 342. Flexible conduit fitting 300 is similar to flexible conduit fitting 200 in the manner with which it allows entry and prevents withdrawal of flexible wiring conduit 306, and the following description of operation generally applies to flexible conduit fitting 200 as well as fitting 300. Housing 303 of flexible conduit fitting 300 is configured to support resilient clip 318 in a manner that, during insertion into the aperture 314 of flexible wiring conduit 306 (FIG. 10A), allows the resilient clip to flex and rotate in the direction of motion of the flexible wiring conduit (counter-clockwise in the view of FIG. 10A), allowing the conduit to proceed inward and not preventing the inward motion of the conduit as corrugations of the conduit pass the clip. During attempted withdrawal (or at least motion and/or force exerted in such a direction) of flexible wiring conduit 306 (FIG. 10B), housing 303 supports resilient clip 318 such that resilient clip 318 may rotate a relatively small amount (clockwise in the view of FIG. 10B), then rotation stop 322 of housing 302 may prevent further rotation of the clip. Also during attempted withdrawal of flexible wiring conduit 306, flexure stop 324 may prevent the clip from flexing substantially in the direction of movement of the conduit, such that engagement portion 320 may be robustly supported against a corrugation of the conduit, preventing its further withdrawal. Flexible conduit fitting 300 also includes optional set screw 332, which provides an additional, alternative, or backup means for securing conduit 306 to fitting 300.

Flexible conduit fittings 200 and 300 of FIGS. 8-10B are each structured such that resilient clip 218, 318 allows entry and prevents withdrawal of flexible wiring conduit 206, 306 without requiring manipulation after assembly of the housing 202, 302 and the clip. If removal of flexible wiring conduit 206, 306 from flexible conduit fitting 200, 300 is desired after they are joined, this may be achieved, sometimes with partial disassembly of the fitting. With optional screw 210 and washer 212 removed from flexible conduit fitting 200, an opening or notch 226, 326 in housing 202, 302 allows resilient clip 218, 318 to be removed, for example, with a tool 228 such as pliers, as illustrated schematically in FIG. 11. With resilient clip 218, 318 removed, flexible wiring conduit 206, 306 may be withdrawn from the flexible conduit fitting 200, 300 without significant impediment. Resilient clip 218, 318 subsequently may be replaced into housing 202, 302 of the flexible conduit fitting 200, 300 such that the fitting may once again be configured to secure a flexible wiring conduit.

In another example, a flexible conduit fitting (not shown) similar to fitting 200 of FIGS. 8 and 9 and fitting 300 of FIGS. 10 and 11 may include a housing structured to support a second resilient clip, which may be disposed opposite the resilient clip 218, 318, or at any other suitable position. The second resilient clip may be positioned and structured to provide a biasing force on the conduit, similar to the biasing force provided by portions 140 of the resilient clips 122, 214 of the flexible conduit fittings 108, 110 of FIGS. 1-5. Such a biasing force may be sufficient to maintain conductivity between the conduit and the fitting. In some cases, the second resilient clip may exert the biasing force with a rounded side portion, and in some cases, the second resilient clip may not engage the conduit with an end of the clip.

The disclosure should not be considered limited to the particular examples described above, but rather should be understood to cover all aspects of the disclosure and equivalents thereof. Various modifications, equivalent processes, as well as numerous structures to which the disclosure can be applicable will be readily apparent to those of skill in the art upon review of the instant specification.

What is claimed is:

1. A system comprising:
    a first housing portion defining a first part of an actuator housing and defining a first part of a flexible conduit fitting;
    a second housing portion defining a second part of the actuator housing and defining a second part of the flexible conduit fitting;
    the actuator housing configured to house an HVAC actuator, the flexible conduit fitting including an aperture for receiving an end of a flexible wiring conduit, where the flexible wiring conduit has a generally corrugated outer structure;
    a resilient clip supported by the flexible conduit fitting of the actuator housing, the resilient clip having an engagement portion and a biasing portion, the engagement portion extending into the aperture of the flexible conduit fitting to engage the generally corrugated outer structure of the flexible wiring conduit, the biasing portion extending into the aperture of the flexible conduit fitting and biasing the flexible wiring conduit away from the engagement portion of the resilient clip and toward a wall that defines the aperture of the flexible conduit fitting opposite the engagement portion, the biasing portion biasing the flexible wiring conduit in a direction substantially perpendicular to the direction of movement of the flexible wiring conduit; and
    the flexible conduit fitting of the actuator housing is configured to support the resilient clip in a manner that allows the resilient clip to flex in a direction of movement of the flexible wiring conduit when the flexible wiring conduit is being inserted into the aperture and past the engagement portion of the resilient clip, but to not substantially flex in the direction of movement of the flexible wiring conduit when attempting to withdraw the flexible wiring conduit from the aperture.

2. The system of claim 1, wherein the first housing portion is releasably secured to the second housing portion with the resilient clip supported between the first housing portion and the second housing portion, and wherein the resilient clip is removable by removing the first housing portion from the second housing portion.

3. The system of claim 1, wherein the actuator housing includes an access opening for removing the resilient clip through the access opening.

4. The system of claim 1, wherein the resilient clip forms a loop configuration with a first end of the loop positioned adjacent to but offset from a second end of the loop.

5. The system of claim 4, wherein the first end of the loop forms the engagement portion, and the actuator housing provides support to the loop adjacent to the engagement portion such that the engagement portion is not allowed to substantially flex in the direction of movement of the flexible wiring conduit when attempting to withdraw the flexible wiring conduit from the aperture.

6. The system of claim 5, wherein at least part of the loop is accessible from outside the actuator housing through an access opening in the actuator housing such that a user can manually flex the loop to disengage the engagement portion from the generally corrugated outer structure of the flexible wiring conduit to facilitate removal of the flexible wiring conduit from the aperture.

7. The system of claim 1, wherein the actuator housing further defines a cavity that is in communication with the aperture, the cavity configured to receive one or more wires from the flexible wiring conduit.

8. The system of claim 7, wherein the cavity is configured to receive an actuator that is connectable to the one or more wires from the flexible wiring conduit.

9. The system of claim 7, wherein the cavity is configured to receive one or more electrical component, that is connectable to the one or more wires from the flexible wiring conduit.

10. The system of claim 7, wherein the cavity is configured as a wiring box for the HVAC actuator.

11. A flexible conduit fitting system structured to receive one or more flexible wiring conduits, the flexible wiring conduits having a generally corrugated outer structure, the system comprising:
    an enclosure, the enclosure having a receptacle including a flexible wiring conduit aperture that is structured to receive a flexible wiring conduit originating outside the enclosure;
    a clip extending into one side of the receptacle, the clip retained in clip-supporting structures of the enclosure, the clip generally taking the form of a loop of spring material having a first end and a second end adjacent to but offset from the first end;

wherein the clip is structured and positioned to allow the flexible wiring conduit to enter the receptacle from outside the enclosure, but to substantially prevent withdrawal of the flexible wiring conduit from the receptacle via interference between the first end of the clip and a corrugation of the flexible wiring conduit, the clip both allowing entry and preventing withdrawal without requiring manipulation after assembly of the enclosure and the clip;

the receptacle also including a release aperture through the enclosure that is apart from the flexible wiring conduit aperture of the receptacle, the release aperture providing direct access to the clip from outside of the enclosure in order to manipulate the clip to release the flexible wiring conduit and allow withdrawal of the flexible wiring conduit from the receptacle.

12. The system of claim 11, wherein the clip includes a release wing proximal the first end that is accessible via the release aperture from outside the enclosure to move the first end such that it does not interfere with the corrugation of the flexible wiring conduit, allowing withdrawal of the flexible wiring conduit from the receptacle.

13. The system of claim 11, wherein the enclosure is structured to selectively allow access to the clip, the clip being freely removable from and placable into the clip-supporting structures of the enclosure.

14. The system of claim 11, wherein the loop of the clip is formed with a rounded bend proximal the second end of the clip, the clip being positioned in the clip-supporting structures of the enclosure and shaped such that the rounded bend exerts a bias force on the flexible wiring conduit toward a side wall of the receptacle opposite the rounded bend when the flexible wiring conduit is disposed in the receptacle.

15. The system of claim 14, further wherein the bias force exerted by the rounded bend on the flexible wiring conduit is sufficient to maintain a specified degree of electrical conductivity between the conduit and the opposing side wall of the a receptacle.

16. The system of claim 14, wherein the loop of the clip includes a substantially flat section substantially opposite the rounded bend, and further wherein the clip-supporting structures of the enclosure include at least one support positioned to support the loop at the substantially flat section against the reaction force exerted by the flexible wiring conduit counter to the force exerted by the rounded bend on the flexible wiring conduit.

17. The system of claim 11, wherein the clip includes a position constraint wing, the position constraint wing cooperating with at least one feature of the clip-supporting structures of the enclosure to floatingly constrain the clip relative to the enclosure.

18. An HVAC actuator, comprising
an actuator motor;
an enclosure housing the actuator motor, the enclosure having a receptacle structured to receive a flexible conduit originating outside the enclosure;
a clip retained in clip-supporting structures of the enclosure on one side of the receptacle, the clip being formed as a single piece and structured such that, when the flexible conduit is disposed in the receptacle:
a first flexible conduit contacting portion of the clip interferes with removal of the flexible conduit from the receptacle;
a second flexible conduit contacting portion of the clip that is distinct from the first flexible conduit contacting portion exerts a bias force on the flexible conduit towards a side wall of the receptacle opposite the first flexible conduit contacting portion; and
the enclosure further comprising a release aperture that provides access to the clip from outside of the enclosure to allow a user to manipulate the first flexible conduit contacting portion away from the flexible conduit to not interfere with removal of the flexible conduit from the receptacle while the second flexible conduit contacting portion biases the flexible conduit away from the manipulated first flexible conduit contacting portion to help the flexible conduit not interfere with removal of the flexible conduit from the receptacle.

* * * * *